Patented July 26, 1927.

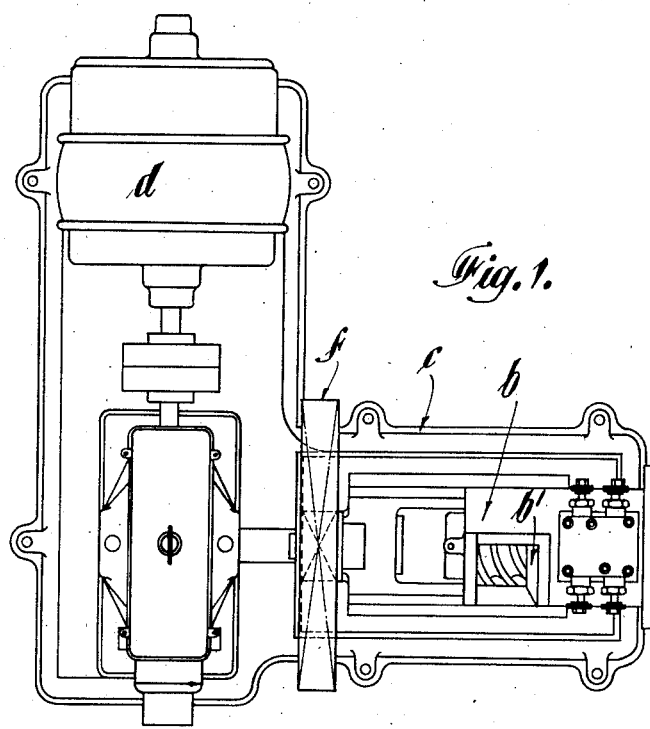

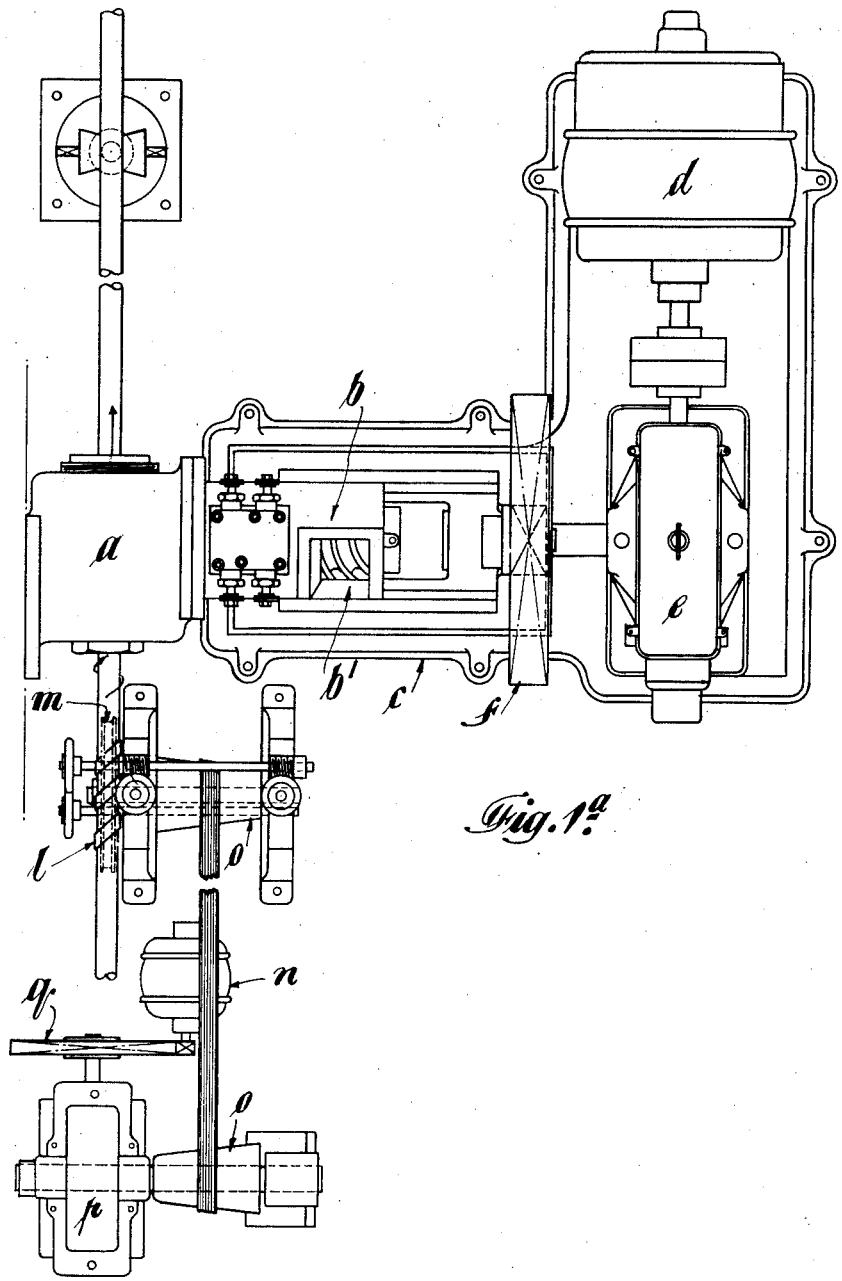

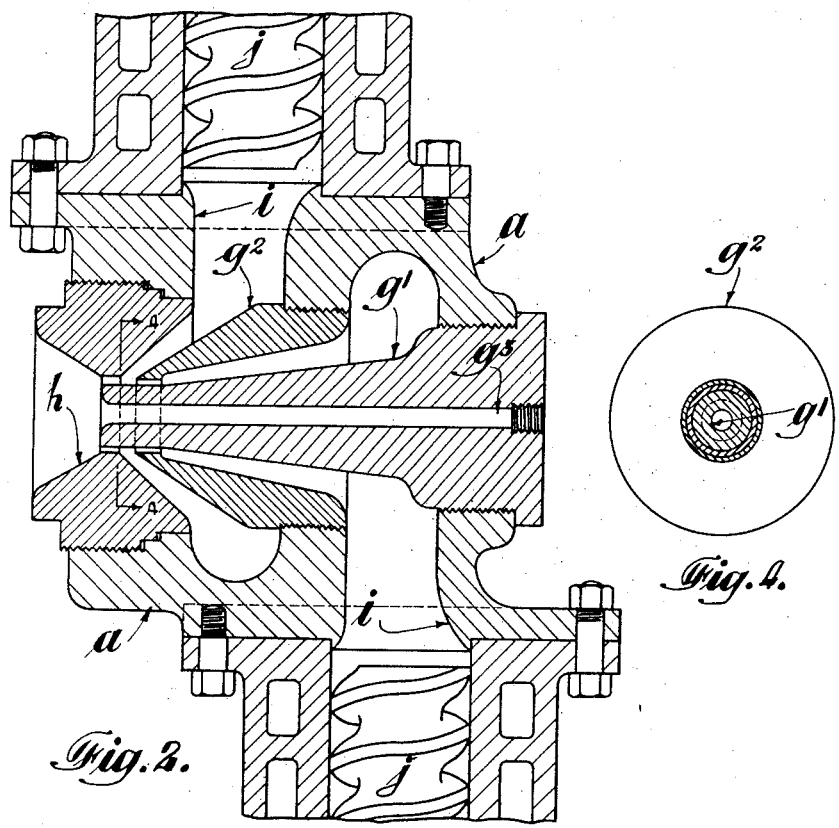
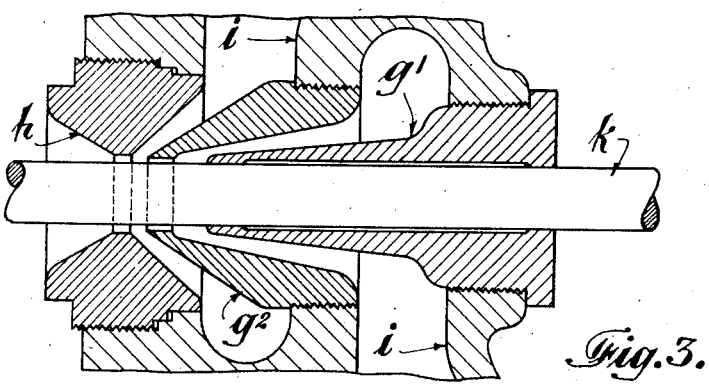

1,637,207

UNITED STATES PATENT OFFICE.

WALTER PERCY WHITEHOUSE, OF GRAVESEND, ENGLAND.

RUBBER AND LIKE FORCING MACHINE, EXTRUSION PRESS, AND THE LIKE.

Application filed May 21, 1923, Serial No. 640,559, and in Great Britain May 31, 1922.

This invention relates to the manufacture of tubes, sheets and the like from plastic rubber or like material and refers to and consists of an improved method of and means for producing same.

According to the invention, instead of the rubber being extruded in the form of a complete annulus or a single layer it is extruded in strips and said strips immediately after extrusion are united at their edges to form the complete tube. By this method of manufacture the tubes can be composed of stripes of different qualities, kinds or colours, and either straight or spiral in the case of tubes.

For producing the tubing, the extrusion press employed comprises a single compound nozzle and two feeding scrolls or worms, or hydraulic rams, or the like, both delivering plastic rubber to the nozzle and each provided with gearing, the speed of which can be independently varied to suit requirements. The different qualities, etc., of rubber are fed by the respective scrolls or rams to the nozzle and emerge from the nozzle, or the die fitted to said nozzle, in the form of single tube, one quality or colour of rubber in strip form, lying parallel with another and the several strips forming the desired tubing. A mandril may be employed, which may rotate and move endwise to assist the strips to assume a spiral form.

Upon the accompanying drawings:

Figs. 1 and 1ª illustrate a plan view or forcing press embodying the invention.

Fig. 2 illustrates to a larger scale a sectional plan taken through the nozzles, and through the two scroll or ram chambers.

Fig. 3 illustrates a like view of the nozzles but modified for use with a mandril.

Fig. 4 illustrates a cross section of part of Fig. 2 on line 4—4.

Fig. 7 illustrates an end view of the nozzles shown in Fig. 5, while

Referring to Fig. 1, $a$ is the casing containing the nozzles through which the rubber or other plastic substance is extruded. $b$, $b$ are the casings or cylinders containing the scrolls by which the plastic substance is expelled through the nozzles, said casing $a$ being flanged and bolted to like flanges on the cylinders $b$, $b$ which are each mounted on a bed-plate $c$. Each scroll is preferably driven (rotated) by an electric motor $d$, through worm gearing at $e$, and spur gearing $f$ at a comparatively slow speed, the two scrolls being preferably driven at variable speeds. Each cylinder $b$, $b$ is provided with a feed opening $b$, and each is steam jacketed.

In the production of tubing composed of two concentric layers of rubber or other plastic material, the arrangement of the extrusion nozzles will be preferably as shown in Fig. 2 or Fig. 3 $g$ being the inner nozzle and $g$ the outer nozzle, and each of conical formation on its exterior and the outer nozzle also being conical on its interior. In Fig. 2 no mandril is used, the inner nozzle having a through passage $g$ according to common practice.

Surrounding the outlet end of the inner nozzle $g$ is the conical faced die member $h$, screwing into the nozzle casing $a$; in like manner to the nozzles $g$, $g$. $i$, $i$ are ports in the nozzle casing $a$, through which the plastic material is fed to the nozzles by the scrolls $j$, $j$. Under the pressure of the scrolls the plastic material emerges in the form of a single tube composed of two concentric layers, see Fig. 4. The tubing as it emerges from the nozzles is carried by suitable supports and treated in any desired manner, such as vulcanization in the case of rubber, to render it suitable for use.

In Fig. 3 a mandril $k$ is used, upon which the tubing is formed and carried forward, the mandril being supported on carriers rollers, see Fig. 1 and being fed through the extrusion nozzles by any suitable mechanism.

Figure 5:
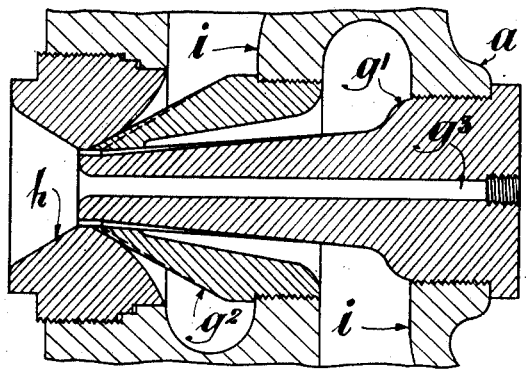
Figs. 5 and 6 illustrate respectively further sectional plan views of the nozzles, constructed according to further modifications.
Figure 7:
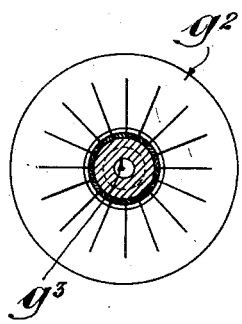

Instead of the plastic material issuing in the form of tubes from the nozzles, it may issue therefrom in the form of strips, the several strips lying side by side and collecttively forming the desired tubing, the nozzles g g being formed with grooves, see Fig. 5, through which the plastic material flows in strip form, the grooves of one nozzle overlying those of the other nozzle and finally merging to form a single tube with the strips of the two qualities alternately arranged, see Fig. 7.

Figure 6:
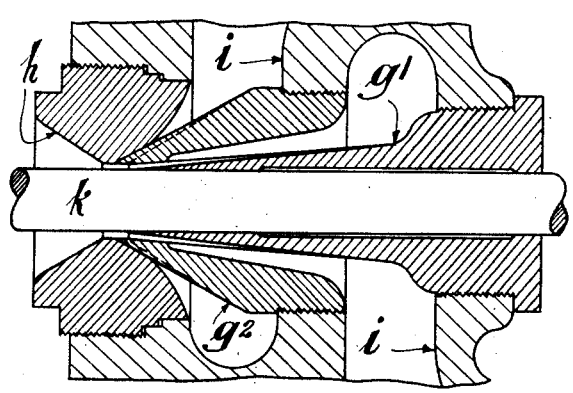
Figure 8:
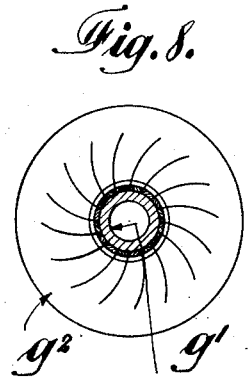
Fig. 8 illustrates an end view of Fig. 6.
Figure 9:
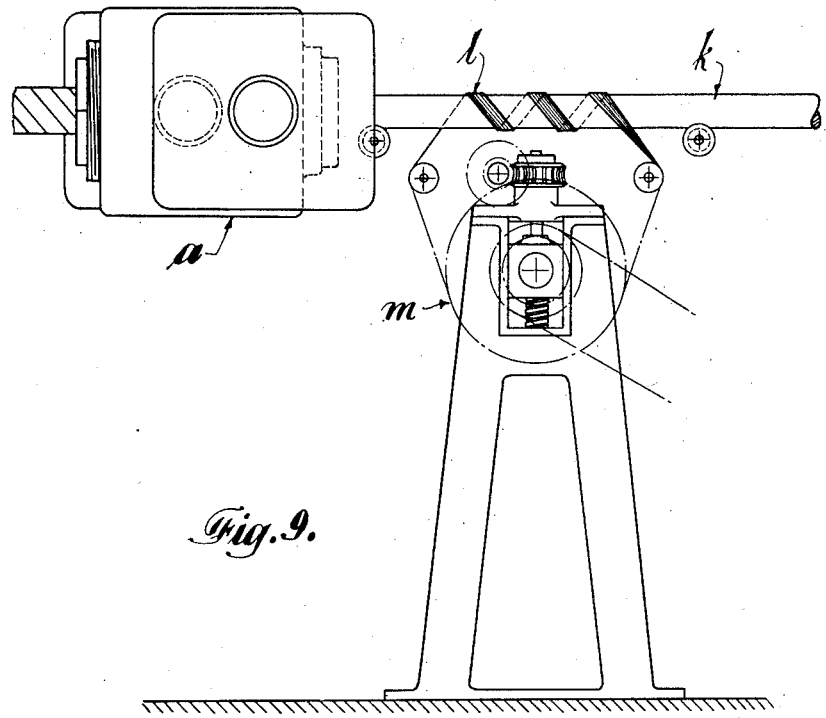
Fig. 9 illustrates an exterior side elevation of the nozzle casing, of a mandril passing through the casing and of an arrangement of endless flexible band and driving gear therefor for feeding the mandril through the nozzles and also rotating same.

By arranging the grooves in a spiral path, see Figs. 6 and 8, and by providing the nozzles with a mandril and rotating said mandril while also feeding it endwise through the nozzles, the strips of plastic material take up a spiral formation around the mandril, the coils of two ply strips collectively producing the desired tubing.

The mechanism for feeding and rotating the mandril may vary, one example consists of an endless belt, one part of which is wrapped tightly around the mandril, while another preferably receiving its motion from an electric motor $n$ through cone pulleys $o$, belt and reducing gears $q$, $q$. The speed of the pulleys is made variable through the cone pulleys.

Figure 10:
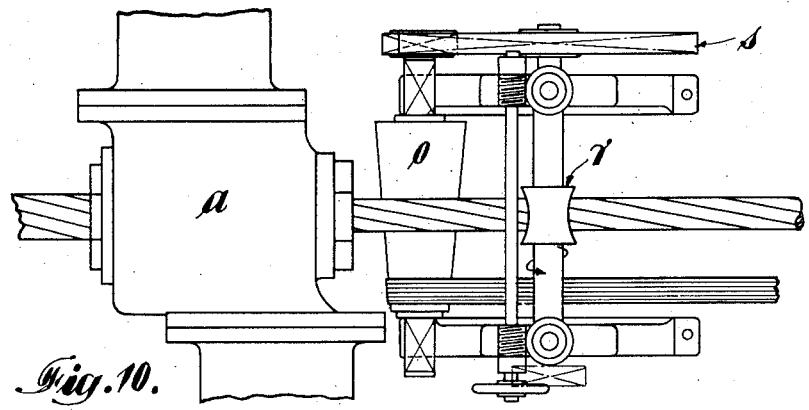
Fig. 10 illustrates another plan of the nozzle casing and of another type of mandril and of means for rotating and simultaneously feeding the mandril through the nozzles.

In another example, see Fig. 10, the mandril, preferably made to a rectangular cross section and twisted spirally, is fed through the nozzles $g$, $g$ and simultaneously rotated by means of a roller (or rollers) engaging the flats of the mandril, the rotations of the roller (or rollers) producing a forward and rotary movement of the mandril. The roller (or rollers) will preferably be rotated through spur gearings and cone pulleys, which allow of the speed being varied.

The nozzles $g$, $g$ may be rotated and the mandril have only an endwise movement, and when the mandril of spiral formation is used, the inside bore of the nozzle $g$ may be formed to a like spiral, or it may be plain.

It will now be seen that by this invention, tubes, strips or sheets of rubber or like plastic material can be formed composed of two (or more) kinds, qualities, grades or colours, or of the same kind, quality, grade, or colour. In the case of rubber tubing, it may be formed with a lining of hard rubber and an outer covering of soft rubber, or vice versa, or with a lining of one colour and a covering of another colour. Further when the outer covering is made from strips or rubber (see Figs. 7 and 8) the strips may vary in colour and give a pattern effect.

Hydraulic rams may be used in place of scrolls or worms. The nozzles and dies may also vary to suit the required section of object or layer to be formed. The nozzles shown in Figs. 1 to 6 are separately formed, and serve for extruding two qualities or thicknesses only, they may be compounded and there may be more than two nozzles and more than two qualities or thicknesses extruded, each nozzle having its own feed scroll or ram.

It will be understood that in all cases the various scrolls will preferably be capable of being varied in speed to suit plastic materials differing in consistency.

What I claim is:—

1. A machine for the manufacture of sheet material in tubular or flat form from plastic material such as rubber, comprising a series of grooved conical extrusion nozzles, spiral grooves in the faces of said nozzles for extruding the plastic material in strip form, the grooved nozzles being concentric, whereby the strips may be extruded in concentric layers, means for supplying the plastic material to the nozzles, and means for uniting the strips edgewise as they leave the nozzles.

2. A machine as claimed in claim 1, wherein the grooved nozzles are conical and are concentric and have a mandril passing through the nozzles, and means for simultaneously advancing and rotating the mandril.

In testimony whereof I have signed my name to this specification.

WALTER PERCY WHITEHOUSE.